United States Patent [19]

Weinberger

[11] Patent Number: 4,689,483
[45] Date of Patent: Aug. 25, 1987

[54] FIBER OPTICAL TEMPERATURE MEASURING APPARATUS
[75] Inventor: Ervin Weinberger, Toronto, Canada
[73] Assignee: Advanced Fiberoptic Technologies Corporation, Downsview, Canada
[21] Appl. No.: 727,354
[22] Filed: Apr. 25, 1985
[51] Int. Cl.[4] .................. G01K 11/00; G01D 5/34
[52] U.S. Cl. .................. 250/231 R; 250/205; 374/161; 374/162
[58] Field of Search .................. 250/227, 231 R, 226, 250/205; 374/161, 162; 455/610, 612

[56] References Cited
U.S. PATENT DOCUMENTS 4,136,566  1/1979  Christensen .................. 250/227
4,270,050  5/1981  Brogardh .................. 250/231 R
4,278,349  7/1981  Sander .................. 356/44
4,281,245  7/1981  Brogardh et al. .................. 250/205
4,288,159  9/1981  Newman .................. 374/161

Primary Examiner—Edward P. Westin
Assistant Examiner—Charles Wieland
Attorney, Agent, or Firm—Ridout & Maybee

[57] ABSTRACT

A fiber optical measuring apparatus in accordance with the invention utilizes the thermal shift of the absorption edge in doped insulators such as colored glass filters. A radiant energy source is operable in a first, normal mode for temperature measurement, and is selectively operable in a second mode for calibration purposes. In the first mode, the source emits light at a wavelength extending into the absorption edge, and in the second mode emits light at a wavelength removed from the absorption edge and at which transmission of the light through the sensing element is not affected by temperature shift. A reference photodetector coupled to the radiant energy source to receive light directly therefrom provides a correcting signal to correct for variations in source intensity. Means are provided for compensation for variations in the temperature of the source.

8 Claims, 6 Drawing Figures

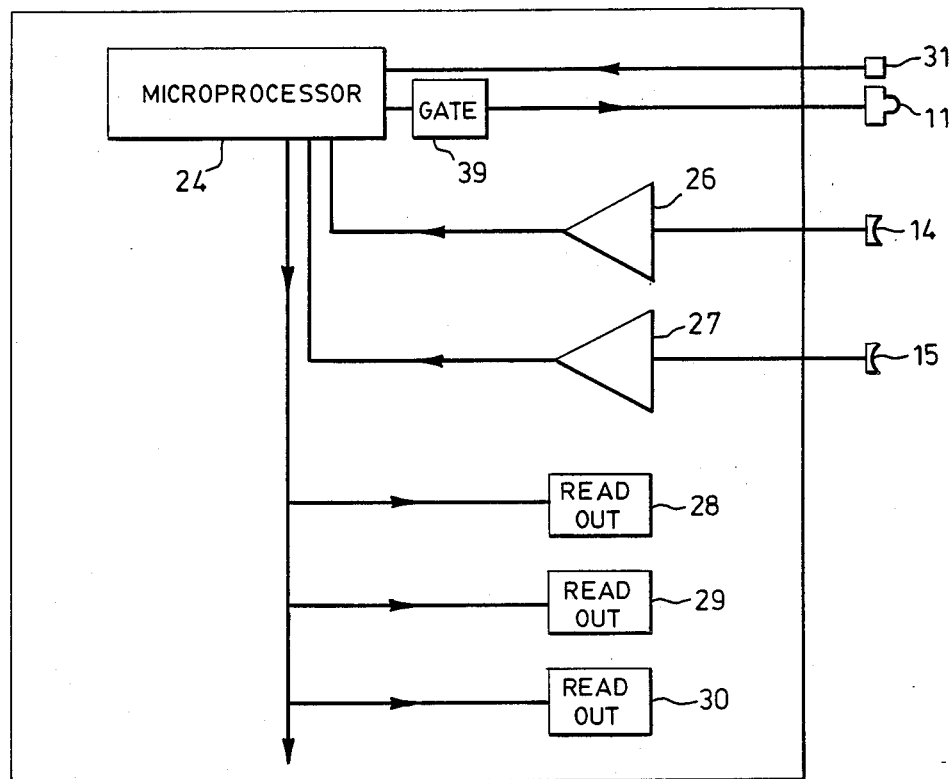
FIG. 4
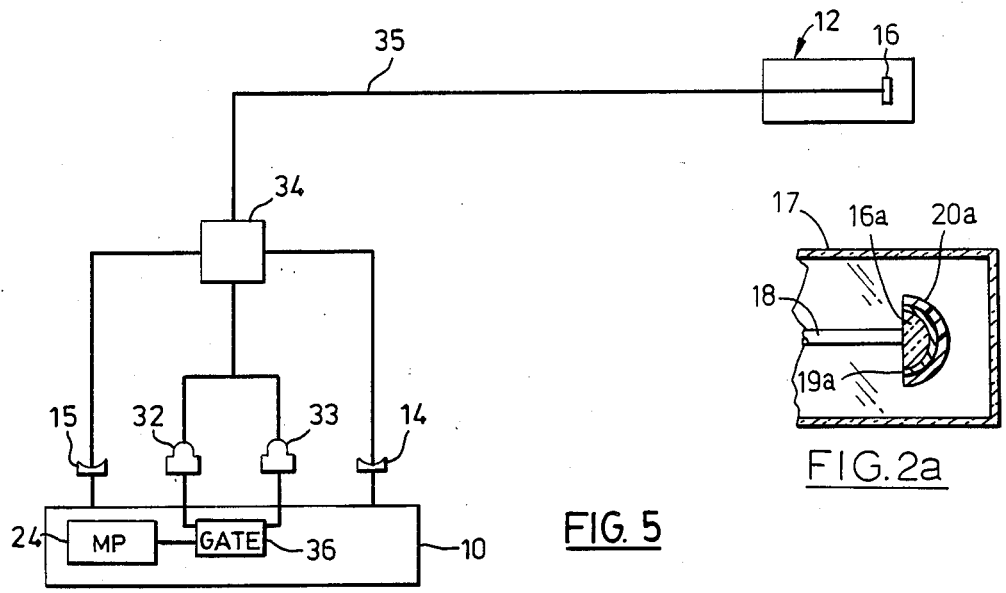
FIG. 5
FIG. 2a

FIBER OPTICAL TEMPERATURE MEASURING APPARATUS

FIELD OF THE INVENTION

This invention relates to temperature measuring apparatus, and is particularly concerned with a temperature measuring apparatus of the kind which employs a fiber optical sensing device suitable for the remote sensing of temperatures in the range −50° C. to about 250° C. The device utilizes the thermal shift of the absorption edge in doped insulators such as, for example, colored glass filters.

BACKGROUND OF THE INVENTION

Remote temperature measurement has generally been limited to electrical techniques. Thermocouples, thermistors, RTD's and semiconductor devices have generally been used as the temperature responsive elements, producing temperature responsive signals in accordance with either junction voltage changes or bulk resistance changes. The temperature-sensitivities of such devices are low, (0.04 mV per degree C. or 0.4% per degree C. being typical,) and the signals are often masked by noise from electrical equipment in the vicinity.

A particularly serious disadvantage of the conventional electrical methods, in certain applications, is that the electrical conductors between the sensors and remote controllers present dangers of explosion or fire in the event of electrical breakdown or short circuit.

In order to avoid the disadvantages mentioned above, numerous fiber optical devices have been proposed for temperature measurement in recent years. One such device is disclosed in U.S. Pat. No. 4,136,566, issued Jan. 30, 1979, to Christensen. In this device the temperature sensing element is a semiconductor such as gallium arsenide which absorbs monochromatic radiant energy as a function of temperature. Radiant energy from a monochromatic source is transmitted via optical fibers to the element and returned via optical fibers to a photodetector whose output corresponds to the temperature to be measured. A problem with devices of this type is that their accuracy is limited by thermally induced spectral shifts in the monochromatic source. Another problem, when such devices are used for remote temperature measurement, is that they must be calibrated in situ since transmission losses would otherwise affect the calibration.

Another fiber optical measuring apparatus which overcomes the latter problem is described in U.S. Pat. No. 4,278,349, issued on July 14, 1981 to Sander. In this case the radiant energy is transmitted to the sensing element at two different wavelengths, the absorption at one of the wavelengths being temperature-dependent and the absorption at the other wavelength being unaffected by temperature changes. The temperature to be measured is determined by comparing the detector responses at the two wavelengths. However, the accuracy of this apparatus is also affected by thermally induced drift.

SUMMARY OF THE INVENTION

A temperature measuring apparatus according to the present invention also provides a fiberoptic system including a sensing element of a material having spectral absorption characteristics with a temperature-dependent transition from a high absorption characteristic to a low absorption characteristic over a range of wavelengths defining an absorption edge. A non-monochromatic radiant energy source having a first and a second operating mode is operable in the first mode to emit radiant energy having a spectral range extending into the absorption edge and in the second mode to emit radiant energy having a spectral range wholly within the range of the low absorption characteristic. Optical fibers coupled to the sensing element define therewith a transmission path for the transmission of radiant energy from the source to the photodetector, and means are provided for selectively operating the radiant energy source in the first operating mode or the second operating mode. A second photodetector is optically coupled to the radiant energy source to receive radiant energy directly therefrom and so provide an output corresponding to source intensity. The outputs from the photodetectors are processed to derive an output signal corresponding to temperature at the sensing element, the output signal being independent of source intensity, and means operable in the second operating mode of the radiant energy source are provided for adjusting said output signal to a predetermined value.

The radiant energy source may be a single light emitting diode which is selectively operable in the first and second operating modes. Alternatively, the radiant energy may comprise a pair of light emitting diodes each operable in a respective one of said spectral ranges.

The temperature of the radiant energy source is continuously measured and is used as a compensation parameter for the determination of the temperature at the sensing element. This eliminates the problem inherent in all "edge-sensing" thermo-optical devices, where the temperature measurement is sensitive to the operating temperature of the radiant energy source.

The sensing element is preferably a doped insulator, such as a colored glass filter for example, which has a much lower index of refraction than the semiconductor materials commonly used hitherto.

DESCRIPTION OF THE PREFERRED EMBODIMENTS

Two embodiments of the invention will now be described, by way of example, with reference to the accompanying drawings, in which:

FIG. 2a shows a detail of a modification of the sensing head of FIG. 2;

FIG. 4 is a schematic block diagram showing certain components of the control unit of FIG. 1; and FIG. 5 is a diagram corresponding to FIG. 1 showing the optical configuration of a second temperature measuring apparatus in accordance with the present invention.

Figure 1:
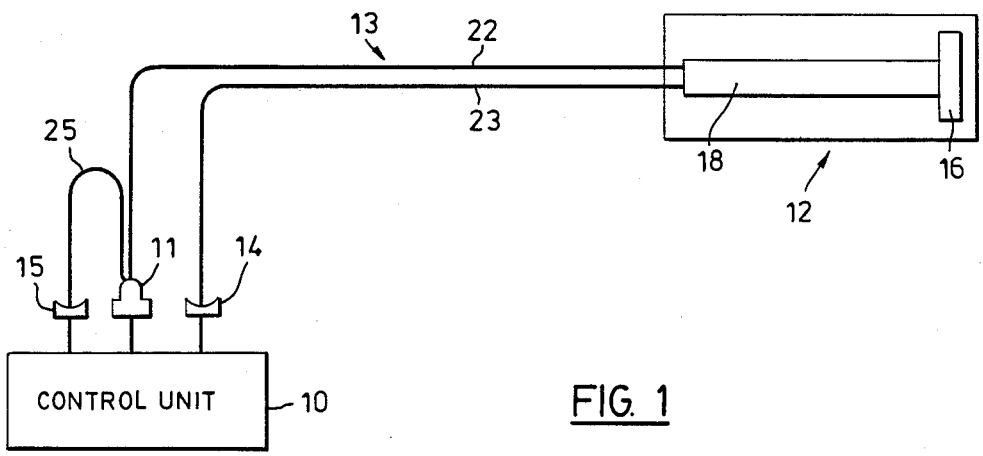
FIG. 1 is a schematic diagram of the optical configuration of a first temperature measuring apparatus in accordance with the invention.

Referring to FIG. 1, the apparatus comprises essentially an electronic control unit 10, a non-monchromatic radiant energy source 11 controlled by the control unit 10, a remote temperature sensing head 12 interconnected with the source 11 by an optical fiber system 13 providing waveguide means. The optical fiber system also interconnects the sensing head 12 with a first photodetector 14 which receives radiant energy transmitted thereby. A second photodetector 15 continuously monitors the intensity of the source 11 to provide a temperature-independent reference signal as hereinafter described.

Figure 2:
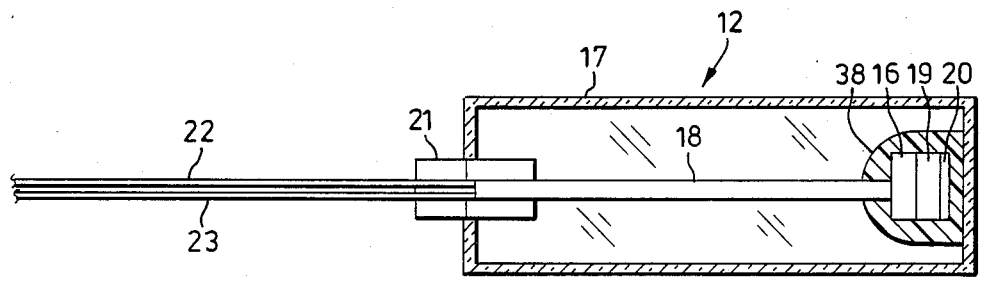
FIG. 2 is an enlarged sectional view of the sensing head of the apparatus.

The sensing head 12, as shown in FIG. 2, comprises a sensing element 16 housed in a suitable protective enclosure 17, which may be a standard thermal protection tube. The sensing element 16 is essentially of a material having spectral absorption characteristics with a temperature-dependent transition from a high absorption characteristic to a low absorption characteristic over a range of wavelengths defining an absorption edge. Such sensing elements are most commonly of semiconductor material such as gallium arsenide, but in the present application it is preferred that the material should be a doped insulator having a refractive index less than 2.0 at the wavelengths to which it is exposed. In the present example the material of the sensing element is a colored glass filter, having a refractive index in the region of 1.5. A particular advantage of using a doped insulator material for the purpose is that the optical properties can be tailored by suitably adjusting the type and concentration of impurities used.

The sensing element 16 is in the form of a plate having a pair of parallel opposite surfaces. The front surface of the element is optically coupled to a temperature-resistant optical fiber 18, which extends within the enclosure and provides a common transmission path for radiant energy to and from the element 16. The rear surface of the sensing element 16 is silvered or otherwise coated with a layer of highly reflective material 19 or dielectric mirror materials. The latter may be overcoated with a layer 20 of protective material such as magnesium fluoride or silica. The element assembly is mounted in place within the enclosure 17 and is bonded to the fiber 18 by a suitable bonding material.

The optical fiber 18 is optically coupled, by a fiberoptic connector 21, to a pair of optical fibers 22, 23. The fiber 22 is optically coupled at its far end to the source 11 to receive radiant energy therefrom, and the fiber 23 is optically coupled at its far end to the first photodetector 14. Thus, the optical fiber system 13 defines with the sensing element 16 a transmission path for the transmission of radiant energy from the source 11 to the first photodetector 14. Radiant energy emitted by the source 11 is transmitted along the optical fibers 22, 18 passes through the material of the sensing element and is reflected from the rear surface thereof, and is received by the photodetector 14 via the fibers 18, 23.

FIG. 2a shows a modification in which the sensing element is shaped as a plano-convex lens 16a. The fiber 18 is optically coupled to the plane front surface of the element. The rear surface is spherical and is coated with a layer or layers of highly reflective material 19a. The latter may be overcoated with a layer of protective material 20a. With this configuration of sensing element the reflective rear surface tends to focus the reflected light towards the end of the fiber 18 and so reduces light loss.

Figure 3:
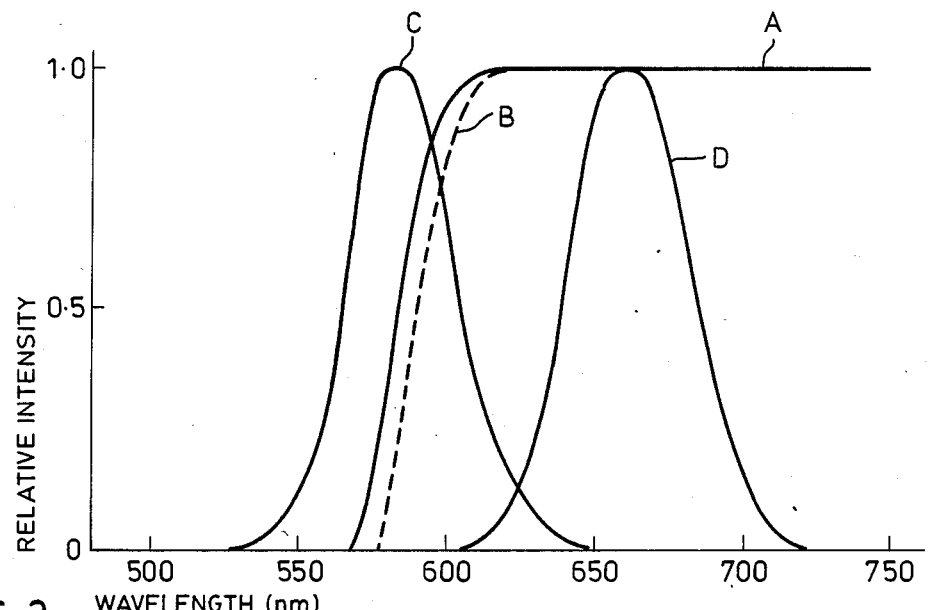
FIG. 3 is a diagram showing light transmission characteristics at different wavelengths.

In FIG. 3, in which relative intensity is plotted against wavelength, Curve A shows the typical transmission characteristics of a doped insulator used for the sensing element of the present invention. The transmission characteristics are, of course, the inverse of the absorption characteristics. Thus, the wavelength range 550 nm to 620 nm corresponds to an absorption edge representing a transition from a high absorption characteristic below 550 nm to a low absorption characteristic above 620 nm. This transition is temperature-dependent, the dotted Curve B showing the corresponding transition at an elevated temperature.

The non-monochromatic radiant energy source 11 is preferably a single light emitting diode which is selectively operable in either of two distinct modes according to the polarity of current applied to it. In the first mode of operation the LED 11 emits light having a spectral range corresponding to the Curve C in FIG. 3, extending into the absorption edge. In the second mode of operation the light emitted has a spectral range corresponding to the Curve D in FIG. 3, i.e. wholly within the range of the low absorption characteristic of the sensing element. The second photodetector 15 is directly coupled to the LED 11 by a short optical fiber 25, thereby providing a signal which at all times is a direct measure of the source intensity.

Referring now to FIG. 4, the control unit 10 comprises a microprocessor 24, which serves both to control the emission of light from the LED 11 and to process signals from the photodetectors. The microprocessor 24 may suitably be a 6809 microprocessor, which is commercially available from several suppliers, and is well adapted to perform the functions described below.

The LED 11 is energized directly from the microprocessor 24, the polarity of the applied current being determined by the state of a gate 39 serving as a reversing switch. The gate 39 can be operated manually, or automatically by the microprocessor when it is switched on, to set the LED 11 in its second mode of operation for initial calibration. For normal temperature measurements the gate is reversed to set the LED in its first operating mode.

The signals from the photodetectors 14 and 15 are amplified by respective adjustable gain amplifiers 26, 27, and applied to the microprocessor which determines their ratio, this ratio being a value which corresponds to temperature at the sensing head and is independent of source intensity. This value is read out in digital and in analog form at read-out terminals 28, 29, 30.

The intensity of light received by the photodetector 15 is directly proportional to the intensity I of the source 11.

The intensity of light received by the photodetector 14 depends upon a number of factors, namely the source intensity I, temperature-independent losses L in the optical fiber system, temperature-independent losses C at the sensing head, and temperature-dependent losses F(T) of the sensing element itself.

The ratio of the signals from the photodetectors is independent of source intensity and depends only upon the losses L, C and F(T). The losses L and C are determined by the installation and remain constant thereafter; it is not necessary to monitor them constantly. The apparatus can therefore be calibrated directly in temperature.

For the purpose of checking the calibration, which need only be done occasionally, the gate 39 is switched to energize the LED 11 in its second mode of operation. In this mode the light received by the photodetector 14 is independent of temperature at the sensing head and depends only on source intensity. The ratio of the signals from the two photodetectors, however, is independent of source intensity and the read-out from the apparatus can readily be adjusted to a predetermined value by adjusting the gains of the amplifiers 26, 27.

A thermistor 31 is attached to the LED 11 and is used to measure its temperature to provide a temperature correction signal for the microprocessor. The reason for this correction is that the spectral distribution of light emitted by the LED will shift with temperature and a correction is required if the source itself is subjected to temperature changes.

Referring now to FIG. 5, the second apparatus is basically similar to the first and corresponding parts are denoted by the same reference numerals. In this case, however, the radiant energy source comprises a pair of light emitting diodes 32, 33 which are energized from the microprocessor 24 and selectively operable one at a time by a gating switch 36. The LED 32 emits light having the spectral range denoted by the Curve C in FIG. 3 and its operation corresponds to the first operating mode of the source 11 in FIG. 1. The LED 33 emits light having a spectral range denoted by the Curve D in FIG. 3 and its operation corresponds to the second operating mode of the source 11 in FIG. 1.

FIG. 5 also shows a preferred optical configuration for optical fibers which have to be of great length, say, in excess of 500 meters. In this case a bidirectional 3×2 optical coupling 34 is used to couple the transmission of light from the LED's to the sensing head 12 and to the reference photodetector 15, and the transmission of light from the sensing head 12 to the photodetector 14. A bidirectional transmission path between the sensing element of the sensing head 12 and the coupling 34 is constituted by a single optical fiber 35 of a length appropriate for the remote installation of the sensing head.

What I claim is:

1. A temperature measuring apparatus comprising
   a sensing head including a thermo-optical sensing element of a material having spectral absorption characteristics with a temperature-dependent transition from a high absorption characteristic to a low absorption characteristic over a range of wavelengths defining an absorption edge, the material of the sensing element being a doped insulator having a refractive index less than 2.0,
   a non-monochromatic radiant energy source having a first and a second operating mode, said source being operable in the first mode to emit radiant energy having a spectral range extending into said absorption edge and in the second mode to emit radiant energy having a spectral range wholly within the range of said low absorption characteristic
   a first photodetector,
   optical fiber means coupled to the sensing element and defining therwith a transmission path for the transmission of radiant energy from the source to said sensing element and from said sensing element to said first photodetector,
   means for selectively operating said radiant energy source in the first operating mode or the second operating mode,
   a second photodetector optically coupled to the radiant energy source to receive radiant energy directly therefrom,
   electronic means coupled to the photodetectors for deriving signals corresponding to the intensity of radiant energy received thereby, and
   processing means for deriving from said signals an output signal corresponding to temperature at said sensing element, the output signal being independent of source intensity,
   said electronic means including means operable in said second operating mode for adjusting said output signal to a predetermined value.

2. A temperature measuring apparatus according to claim 1, wherein the radiant energy source comprises a pair of light emitting diodes each operable in a respective one of said spectral ranges.

3. A temperature measuring apparatus according to claim 1, wherein the radiant energy source is a single light emitting diode which is selectively operable in said first or said second operating mode.

4. A temperature measuring apparatus according to claim 1, wherein the sensing element is a colored glass filter.

5. A temperature measuring apparatus according to claim 1, wherein the sensing element comprises a plate of said material having a pair of opposed parallel surfaces, the optical fiber means including a temperature-resistant optical fiber optically coupled to one said surface and providing a bidirectional transmission path, the opposite surface being coated with reflective material.

6. A temperature measuring apparatus according to claim 1, wherein the sensing element is shaped as a plano-convex lens having a plane front surface and a spherical rear surface, the optical fiber means including a temperature resistant optical fiber optically coupled to said front surface and providing a bidirectional transmission path, the rear surface being coated with reflective material.

7. A temperature measuring apparatus according to claim 1, further comprising a temperature-responsive element disposed adjacent to the radiant energy source, and means for deriving from the temperature-responsive element a compensating signal to compensate for variations in source temperature.

8. A temperature measuring apparatus according to claim 7, wherein the temperature-responsive element is a thermistor.

* * * * *